United States Patent

Thelohan et al.

[11] Patent Number: 5,250,488
[45] Date of Patent: Oct. 5, 1993

[54] MINERAL FIBERS DECOMPOSABLE IN A PHYSIOLOGICAL MEDIUM

[76] Inventors: Sylvie Thelohan, 5, Rue Georges Sache, Paris, France, 75014; Alain De Meringo, 9, Rue Terdonnet, Paris, France, 75010; Hans Furtak, Im Oberkammerer 35, Speyer Am Rhein, Fed. Rep. of Germany; Wolfgang Holstein, Herderstrasse 2, Homberg, Fed. Rep. of Germany, 6313

[21] Appl. No.: 982,136

[22] Filed: Nov. 25, 1992

Related U.S. Application Data

[63] Continuation of Ser. No. 708,661, May 31, 1991, abandoned, which is a continuation-in-part of Ser. No. 565,282, Aug. 9, 1990, Pat. No. 5,108,957.

[30] Foreign Application Priority Data

Aug. 11, 1989 [FR] France .................. 89 10834
Feb. 9, 1990 [FR] France .................. 90 01497
Jun. 1, 1990 [FR] France .................. 90 06841

[51] Int. Cl.$^5$ ............................. C03C 13/06
[52] U.S. Cl. ........................... 501/36; 501/69; 501/70; 501/63
[58] Field of Search .............. 501/32, 35, 70, 63, 501/36, 68, 69, 70

[56] References Cited

U.S. PATENT DOCUMENTS

| | | | |
|---|---|---|---|
| 2,663,051 | 12/1953 | Graybeal et al. | 18/2.6 |
| 3,013,888 | 12/1961 | de Larjarte | 501/35 |
| 3,328,142 | 6/1967 | Levecque | 501/35 |
| 3,513,002 | 5/1970 | Labino | 501/35 |
| 3,853,569 | 10/1974 | Laurent et al. | 106/50 |
| 4,312,952 | 1/1982 | Carbol | 501/36 |
| 4,381,347 | 4/1983 | Carbol | 501/36 |
| 4,605,415 | 8/1986 | Richez | 623/16 |
| 4,615,988 | 10/1986 | LeMoigne et al. | 501/30 |
| 4,756,732 | 8/1988 | Barthe et al. | 65/6 |
| 4,759,785 | 8/1988 | Barthe et al. | 65/6 |
| 4,759,974 | 8/1988 | Barthe et al. | 428/224 |
| 5,108,957 | 4/1992 | Cohen et al. | 501/35 |

FOREIGN PATENT DOCUMENTS

| | | |
|---|---|---|
| 0009418 | 4/1980 | European Pat. Off. . |
| 0247817 | 12/1987 | European Pat. Off. . |
| 525634 | 10/1976 | U.S.S.R. . |
| 1211233 | 2/1986 | U.S.S.R. . |
| 2080281 | 2/1982 | United Kingdom . |

OTHER PUBLICATIONS

Chemical Abstract, vol. 98, No. 8 (Feb. 21, 1983) #58810d.
Chemical Abstract, vol. 81, No. 26 (Dec. 1974) #175133v.
Chemical Abstract, vol. 84, No. 12 (Mar. 22, 1976) #78592y.
Chemical Abstracts, vol. 84, No. 12, (Mar. 22, 1976) #78607g.
Chemical Abstracts, vol. 108, No. 8 (Feb. 1988) #612226y.
Chemical Abstracts, vol. 92, No. 8 (Jun. 1980) #202476v.

*Primary Examiner*—Mark L. Bell
*Assistant Examiner*—Chris Gallo
*Attorney, Agent, or Firm*—Pennie & Edmonds

[57] ABSTRACT

The present invention relates to mineral fiber compositions useful for forming fibers which are readily degraded in a physiological medium such as that found within the human body. Advantageous compositions formed according to the present invention comprise the following components in the proportions by weight set forth below:

| | |
|---|---|
| $SiO_2$ | 37 to 58 wt. %; |
| $Al_2O_3$ | 4 to 14 wt. %; |
| CaO | 7 to 40 wt. %; |
| MgO | 4 to 16 wt. %; |
| $P_2O_5$ | 1 to 10 wt. %; |
| $Fe_2O_3$ | up to about to 15 wt. %; | wherein the amount of $CaO + MgO + Fe_2O_3$ is greater than 25% and the total amount of $Na_2O + K_2O$ is less than 7%. The total iron contained within the composition is expressed in the form of ferric oxide ($Fe_2O_3$).

7 Claims, No Drawings

MINERAL FIBERS DECOMPOSABLE IN A PHYSIOLOGICAL MEDIUM

CROSS-REFERENCE TO RELATED APPLICATIONS

This application is a continuation of application Ser. No. 07/708,661, filed May 31, 1991, now abandoned; which is a continuation in part of application Ser. No. 07/565,282, filed Aug. 9, 1990, now U.S. Pat. No. 5,108,957.

FIELD OF THE INVENTION

The present invention relates to mineral fibers which, by virtue of their composition, are readily decomposable upon contact with a physiological medium.

BACKGROUND OF THE INVENTION

Buildings are frequently insulated with respect to heat and sound by products incorporating mineral fibers, such as rock or slag fibers. The particular arrangement of the premises to be insulated often requires the personnel responsible for fitting these products to cut and/or shape them at the job site. This operation, however, typically causes breakage of the fibers and the possible dispersion of some of these fibers and/or fiber fragments into the atmosphere.

In a like manner mineral fibers are also used in industry to produce, e.g., geometrically shaped panels and tubular products for various applications. In addition such fibers are also commonly used in industry to form, e.g., mats sewn over cardboard or metal grills or netting to form pads or alternately to form such pads by filling in bulk form. In many of these applications the finished product must be cut and/or shaped prior to its final installation.

It follows, therefore that at times there is a danger of accidental inhalation of fibers or fiber fragments by those who come into contact with them. Although the inhalation of these fibers and/or fragments has not been demonstrated to be harmful, the need is felt to reassure those working with these products by offering them a demonstrably safe product.

SUMMARY OF THE INVENTION

An object of the present invention is to provide mineral fibers having a composition which decomposes rapidly upon contact with a physiological medium. By a "physiological medium", applicants mean a medium such as that typically found within a human body.

A further object of the present invention is to provide compositions which may be formed into decomposable fibers of the type described above by the use of so-called "outer" centrifugation techniques.

Outer centrifugation techniques, which are well known in the art, are typically used to form fibers from glasses obtained by melting raw materials such as blast furnace slag or basalts. Some of these techniques, also referred to as free centrifuging techniques, involve pouring a thin stream of molten glass onto the peripheral strip of a centrifuging wheel rotating at high speed about a shaft perpendicular to the direction of the thin glass stream. Under the effect of centrifugal force, some of the glass is converted into fibers, with the remainder of the glass being conveyed to a second wheel where the same procedure is repeated. In this manner, therefore, three or four wheels may be interposed along the path of the molten glass. Techniques such as those described above are particularly useful in forming the mineral fibers of the present invention.

The objects of the present invention are achieved by modifying known glass compositions typically used in the free centrifuging techniques described above. Based upon compositions of this type, essentially comprising silica, alumina and alkaline earth oxides, it has been discovered that the addition of phosphorus pentoxide results in the formation of mineral fibers which decompose rapidly in a physiological medium.

It has further been found that mineral fibers formed from the compositions of the present invention do not suffer any substantial diminution of their properties in comparison to those of prior art products, i.e., those which are only slightly or not at all decomposable in a physiological medium. Thus, the compositions of the invention can be readily converted into fibers using conventional centrifuging wheels.

The mineral fibers formed according to the present invention are prepared from compositions comprising the following components (in weight percent):

| | |
|---|---|
| $SiO_2$ | 37 to 58% |
| $Al_2O_3$ | 4 to 14% |
| CaO | 7 to 40% |
| MgO | 4 to 16% |
| $P_2O_5$ | 1 to 10% |
| $Fe_2O_3$ | up to 15% | wherein the amount of $CaO + MgO + Fe_2O_3$ is greater than 25% by weight of the total composition, and the total amount of $Na_2O$ and $K_2O$ is less than about 7 wt. %. The total iron contained in the compositions of the invention is expressed in the form of ferric oxide (i.e., $Fe_2O_3$).

The compositions defined above may, if desired, be prepared from substantially pure constituents. Generally, however, they are obtained by melting a mixture of vitrifiable raw materials, possibly additionally containing other metal oxides such as, for example, titanium oxide and manganese oxide. These additional oxides are considered as impurities within the scope of the invention. The total content of these impurities should be maintained at less than or equal to about 3 weight percent of the total composition.

To permit the formation of mineral fibers from the compositions of the invention with the use of outer centrifuging techniques, the compositions of the invention must have a suitable viscosity at a relatively low temperature. The viscosity of these materials depends to a great extent on the total amount of $SiO_2$ and $Al_2O_3$ in the subject compositions. Within the scope of the invention, the amount of these oxides is generally equal to or greater than about 50 weight percent of the total composition.

In addition, the ability to produce fibers from the compositions of the invention is inversely proportional to the ability of the material to develop crystals in its mass. This phenomenon, known as devitrification, is characterized by several temperatures: that at which the rate of crystal growth is at its maximum and that at which this rate of growth is zero, i.e., the liquidus temperature. Generally, devitrification may be increased or decreased by adjusting the total amount of alkaline earth oxides in the composition. Within the scope of the invention, the amount of such alkaline earth oxides should be maintained at less than about 40 weight percent of the total composition.

Moreover, in order to ensure that the fibers formed according to the invention are sufficiently heat resistant, it is desirable for the amount of $CaO+MgO+Fe_2O_3$ in the compositions to be greater than about 25 weight percent of the composition.

DETAILED DESCRIPTION OF THE PREFERRED EMBODIMENTS

A first preferred range of components for mineral fibers formed according to the present invention is set forth below in the following proportions by weight:

| | |
|---|---|
| $SiO_2$ | 45 to 57% |
| $Al_2O_3$ | 3 to 6% |
| CaO | 20 to 30% |
| MgO | 6 to 16% |
| $Fe_2O_3$ | 0.1 to 4% |
| $P_2O_5$ | 1 to 7% |
| $Na_2O + K_2O$ | 0.1 to 5% |
| Impurities | ≦3% |

A second embodiment of the present invention comprises the following components in the following weight proportions:

| | |
|---|---|
| $SiO_2$ | 39 to 50% |
| $Al_2O_3$ | 7 to 13% |
| CaO | 20 to 30% |
| MgO | 6 to 16% |
| $Fe_2O_3$ | 0.1 to 4% |
| $P_2O_5$ | 3 to 9% |
| $Na_2O + K_2O$ | 0.1 to 5% |
| Impurities | ≦3% |

The advantages of the mineral fiber compositions of the present invention are set forth in the following description, illustrated by some non-limiting examples.

EXAMPLES

The measurements of the degree of decomposition undergone by the fibers of the present invention in the physiological medium were performed on fibers having a substantially constant diameter of approximately 10 μm.

The fibers were immersed in a solution which simulated an extracellular fluid having the following composition (expressed in g/l):

| | |
|---|---|
| $MgCl_2.6H_2O$ | 0.212 |
| NaCl | 6.415 |
| $Na_2HPO_4$ | 0.148 |
| $Na_2SO_4.2H_2O$ | 0.179 |
| $CaCl_2.4H_2O$ | 0.318 |
| $NaHCO_3$ | 2.703 |
| ($Na_2$ tartrate).$2H_2O$ | 0.180 |
| ($Na_3$ citrate).5, $5H_2O$ | 0.186 |
| Na lactate | 0.175 |
| Na pyruvate | 0.172 |
| Glycine | 0.118 |

The test conditions selected for determining the degree of decomposition of the mineral fibers in the above-described solution were as follows: 200 mg of fibers were placed between two perforated discs separated by a circular ring. These two discs, each 4.3 cm in diameter, were covered with a polycarbonate filter. This assembly formed a measuring cell through which the physiological solution was circulated. The flow rate of the solution was regulated by a peristaltic pump. The flow rate of the solution was 40 ml per day, with the duration of the test being 20 days. The cell and the flask containing the physiological solution was maintained at a substantially constant temperature of 37° C. After passing through the cell, the physiological solution was collected in bottles to permit subsequent analysis.

The amount of dissolved silica within the solution was thereafter measured by analysis such that the weight of dissolved silica in relation to the weight of silica initially present in the fiber provided a percentage result. This percentage is therefore a good indicator of the capacity of the fiber tested to decompose in a physiological medium.

The compositions tested and the results obtained are presented in Tables 1 and 2 set forth below.

Table 1 sets forth several mineral fiber compositions according to the invention, as well as two prior art compositions used as a reference (i.e., example no. 1 and no. 4).

As illustrated in Table 2, therefore, the presence of phosphorous pentoxide in compositions formed according to the present invention has thus been demonstrated to have the effect of increasing the rate of decomposition of fibers formed from these compositions when such fibers are placed in a physiological medium.

A comparison between example nos. 1 and 3, on the one hand, and example nos. 4 and no. 6, on the other, shows that the effect of reducing the alumina and replacing this amount by silica causes a considerable increase in the degree of decomposition of the fibers tested.

A comparison between example nos. 2 and 3, and between example nos. 5 and 6, illustrates that in examples where the degree of decomposition is considerable, the substitution of silica by phosphorus pentoxide results in a substantial increase in the degree of decomposition on the fibers tested.

The influence of phosphorus pentoxide on the degree of decomposition of the fibers is still quite considerable in compositions having a high alumina content, as shown by the results obtained with example nos. 4 and 7.

The phosphorus containing compound is added to the vitrifiable mixture as, for example, disodic phosphate or calcium phosphate. When the amount of phosphate introduced into the vitrifiable mixture is relatively large, it may sometimes be difficult to melt the mixture. It is for this reason that the phosphorus pentoxide content of the compositions of the invention is maintained at an amount less than or equal to about 10 weight percent of the total composition.

Preferably, the compositions according to the invention comprise less than about 7 weight percent of alkaline oxides. Such compositions have viscosity and devitrification properties suitable to permit the formation of mineral fibers from these compositions with the use of outer centrifuging techniques of the type described above. In addition, as shown, the resultant fibers have a high rate of decomposition in a physiological medium.

The mineral fibers of the invention listed in table no. 1 are all resistant to temperatures of up to about 700° C. It was found that sample blocks of these fibers (100 kg/m³) heated into an oven during 30 minutes sag less than 10% at 700° C.

The compositions of the invention may be converted into fibers by known "outer" centrifuging devices, such as those described in U.S. Pat. Nos. 2,663,051 and 4,661,134 or French Patent Publication No. 2,609,708, for example. The disclosure of each of these references in incorporated herein by reference.

The fibers obtained in this manner permit the formation of excellent quality fibrous products suitable for numerous applications. Thus, for example, the fibers of the present invention may advantageously be formed into geometrically shaped panels, stiffened by a polymerized bonding material, or into tubular products intended, e.g., for duct insulation. Fibers produced according to the invention may also be used to form mats sewn over cardboard or metal grills or netting in the form of pads, or even in bulk form, i.e., by filling.

TABLE NO.1

| Consti- tuents | Compositions in weight percentages | | | | | | | |
|---|---|---|---|---|---|---|---|---|
| | Ex. No. 1 | Ex. No. 2 | Ex. No. 3 | Ex. No. 4 | Ex. No. 5 | Ex. No. 6 | Ex. No. 7 | Ex. No. 8 |
| $SiO_2$ | 47.1 | 49.9 | 56.4 | 45.7 | 49.7 | 52.7 | 39.7 | 44.9 |
| $Fe_2O_3$ | 12.9 | 12.9 | 12.9 | 2.1 | 2.1 | 2.1 | 2.1 | 10 |
| $Al_2O_3$ | 13.8 | 4.5 | 4.5 | 11.5 | 4.5 | 4.5 | 11.5 | 4.5 |
| CaO | 10.3 | 10.3 | 10.3 | 29.5 | 29.5 | 29.5 | 29.5 | 29.5 |
| Mgo | 9.1 | 9.1 | 9.1 | 7.4 | 7.4 | 7.4 | 7.4 | 7.4 |
| $Na_2O$ | 2.7 | 2.7 | 2.7 | 1.4 | 1.4 | 1.4 | 1.4 | 1.4 |
| $K_2O$ | 1.2 | 1.2 | 1.2 | 1.3 | 1.3 | 1.3 | 1.3 | 1.3 |
| $P_2O_5$ | 0.3 | 6.5 | 0.3 | 0.1 | 3 | 0.2 | 6 | 3 |
| Impurities | 2.6 | 2.9 | 2.6 | 1.0 | 1.1 | 0.9 | 1.1 | 0.7 |

TABLE No.2

| duration of test | Chemical Resistance in Physiological Medium Amount of dissolved $SiO_2$ (in percent) | | | | | | | |
|---|---|---|---|---|---|---|---|---|
| | Ex. No. 1 | Ex. No. 2 | Ex. No. 3 | Ex. No. 4 | Ex. No. 5 | Ex. No. 6 | Ex. No. 7 | Ex. No. 8 |
| 20 days | 0.7 | 5.1 | 2.5 | 0.9 | 11.4 | 5.2 | 2.6 | 5.3 |

While it is apparent that the invention herein disclosed is well calculated to fulfill the objectives stated above, it will be appreciated that numerous modifications and embodiments may be devised by those skilled in the art. It is intended that the appended claims cover al such modifications and embodiments as fall within the true spirit and scope of the present invention.

We claim:

1. A mineral fiber composition decomposable in a physiological medium, said composition consisting essentially of:

| | |
|---|---|
| $SiO_2$ | 37 to 58 wt. %; |
| $Al_2O_3$ | 4 to 14 wt. %; |
| CaO | 7 to 40 wt. %; |
| MgO | 4 to 16 wt. %; |
| $P_2O_5$ | 1 to 10 wt. %; |
| $Fe_2O_3$ | 0.1 to 15 wt. %; |
| $Na_2O + K_2O$ | up to about 7 wt. %; and |
| Impurities | up to about 3 wt. %, | wherein the amount of $CaO+MgO+Fe_2O_3$ is greater than 25 wt % of said composition.

2. The composition of claim 1, wherein the amount of $SiO_2+Al_2O_3$ is greater than about 50 wt % of said composition.

3. The composition of claim 1 wherein the amount of $CaO+MgO$ less than about 40 wt % of said composition.

4. A mineral fiber composition decomposable in a physiological medium, said composition consisting essentially of:

| | |
|---|---|
| $SiO_2$ | 45 to 57 wt. %; |
| $Al_2O_3$ | 3 to 6 wt. %; |
| CaO | 20 to 30 wt. %; |
| MgO | 6 to 16 wt. %; |
| $P_2O_5$ | 1 to 7 wt. %; |
| $Fe_2O_3$ | 0.1 to 4 wt. %; |
| $Na_2O + K_2O$ | 0.1 to 5 wt. %; |
| Impurities | up to about 3 wt. % | wherein the amount of $CaO+MgO+Fe_2O_3$ is greater than about 25 wt % of said composition.

5. A mineral fiber composition decomposable in a physiological medium, said composition consisting essentially of:

| | |
|---|---|
| $SiO_2$ | 40 to 50 wt. %; |
| $Al_2O_3$ | 7 to 13 wt. %; |
| CaO | 20 to 30 wt. %; |
| MgO | 6 to 16 wt. %; |
| $P_2O_5$ | 3 to 9 wt. %; |
| $Fe_2O_3$ | up to about 4 wt. %; |
| $Na_2O + K_2O$ | 0.1 to 5 wt. %; and |
| Impurities | up to about 3 wt. % | wherein the amount of $CaO+MgO+Fe_2O_3$ is greater than about 25 wt % of said composition.

6. Mineral fibers comprising the mineral fiber compositions set forth in any one of claims 1 to 5.

7. An insulating material comprising the mineral fibers of claim 6.

* * * * *

UNITED STATES PATENT AND TRADEMARK OFFICE
CERTIFICATE OF CORRECTION

PATENT NO. : 5,250,488

DATED : October 5, 1993

INVENTOR(S) : Sylvie Thelohan et al.

It is certified that error appears in the above-identified patent and that said Letters Patent is hereby corrected as shown below:

On the title page:

Assignee: Isover-Saint Gobain
Courbevoie, France

Signed and Sealed this

Second Day of July, 1996

Attest:

BRUCE LEHMAN

Attesting Officer

Commissioner of Patents and Trademarks